United States Patent [19]

Hurford et al.

[11] Patent Number: 5,556,127
[45] Date of Patent: Sep. 17, 1996

[54] SEAT MOUNTED SIDE IMPACT MODULE

[75] Inventors: Jonathan P. Hurford, Lake Orion; Mohamed Boumarafi, Rochester Hills, both of Mich.

[73] Assignee: Takata, Inc., Auburn Hills, Mich.

[21] Appl. No.: 494,537

[22] Filed: Jun. 26, 1995

[51] Int. Cl.$^6$ .................................................. B60R 21/22
[52] U.S. Cl. ........................................ 280/730.2; 280/728.2
[58] Field of Search ............................. 280/728.2, 728.3, 280/730.1, 730.2, 732, 741

[56] References Cited

U.S. PATENT DOCUMENTS

| | | | |
|---|---|---|---|
| 3,791,669 | 2/1974 | Hamilton | 280/738 |
| 4,877,264 | 10/1989 | Cuevas | 280/731 |
| 4,946,191 | 8/1990 | Putsch | 280/730.2 |
| 5,062,664 | 11/1991 | Bishop et al. | 280/732 |
| 5,112,079 | 5/1992 | Haland et al. | 280/730.2 |
| 5,121,941 | 6/1992 | Mihm et al. | 280/732 |
| 5,224,733 | 7/1993 | Simsic | 280/730.2 |
| 5,251,931 | 10/1993 | Semchena et al. | 280/730.2 |
| 5,277,441 | 1/1994 | Sinnhuber | 280/730.1 |
| 5,281,780 | 1/1994 | Haland | 200/52 R |
| 5,284,358 | 2/1994 | Rhein | 280/728.2 |
| 5,324,072 | 6/1994 | Olson et al. | 280/730.2 |
| 5,333,898 | 8/1994 | Stutz | 280/730.2 |
| 5,348,342 | 9/1994 | Haland et al. | 280/730.2 |
| 5,351,987 | 10/1994 | Donegan et al. | 280/728.2 |
| 5,364,125 | 11/1994 | Brown et al. | 280/730.2 |
| 5,433,471 | 7/1995 | Shepherd et al. | 280/732 |

FOREIGN PATENT DOCUMENTS

| | | | |
|---|---|---|---|
| 4-50052 | 2/1992 | Japan | 280/730.2 |
| 5-97011 | 4/1993 | Japan | 280/728.2 |
| 2247214 | 2/1992 | United Kingdom | 280/728.2 |
| 2257400 | 1/1993 | United Kingdom | 280/728.2 |

OTHER PUBLICATIONS

Research Disclosure, No. 369, Jan. 1995.

*Primary Examiner*—Paul N. Dickson
*Attorney, Agent, or Firm*—Harness, Dickey & Pierce PLC

[57] ABSTRACT

A side impact air bag module assembly for retaining a side impact air bag to a vehicle seat frame which provides a housing having a minimum internal volume configured for mounting to an existing seat back frame with minimal modifications so as to conform to the seat back structure and decrease the packaging size required within the seat back. The housing retains an inflator within a deep-well portion in conjunction with a retainer configured to fasten the air bag and inflator to the housing and seat back frame.

14 Claims, 2 Drawing Sheets

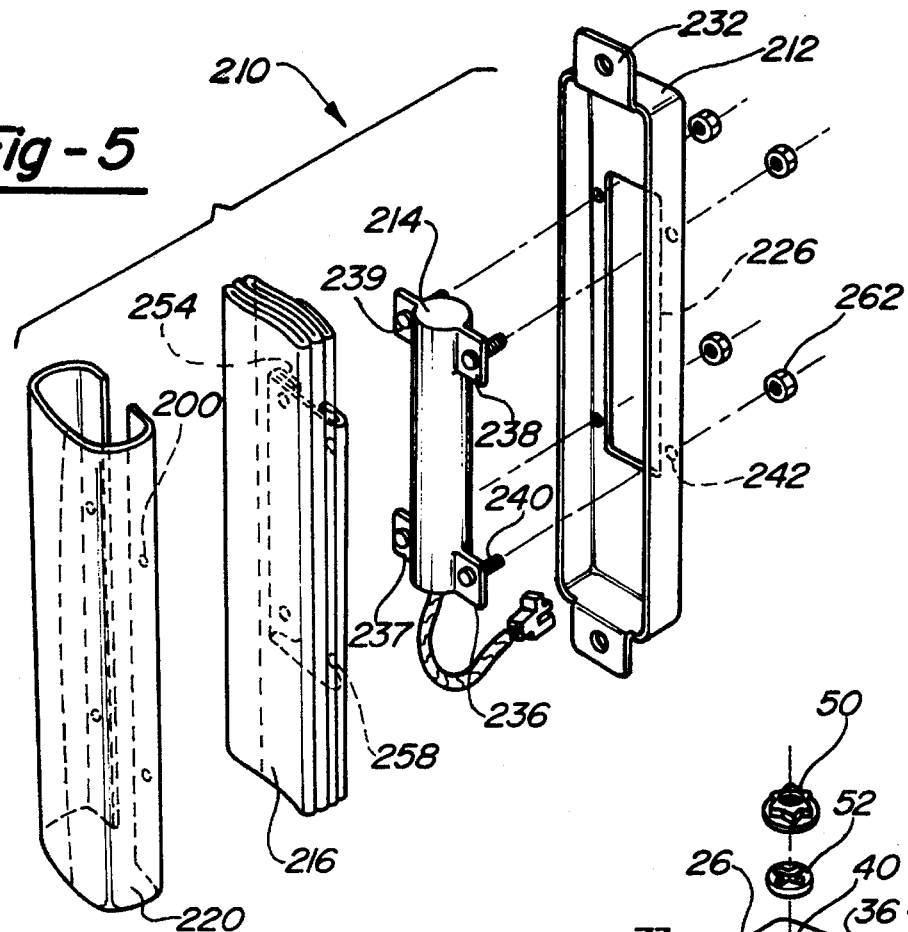
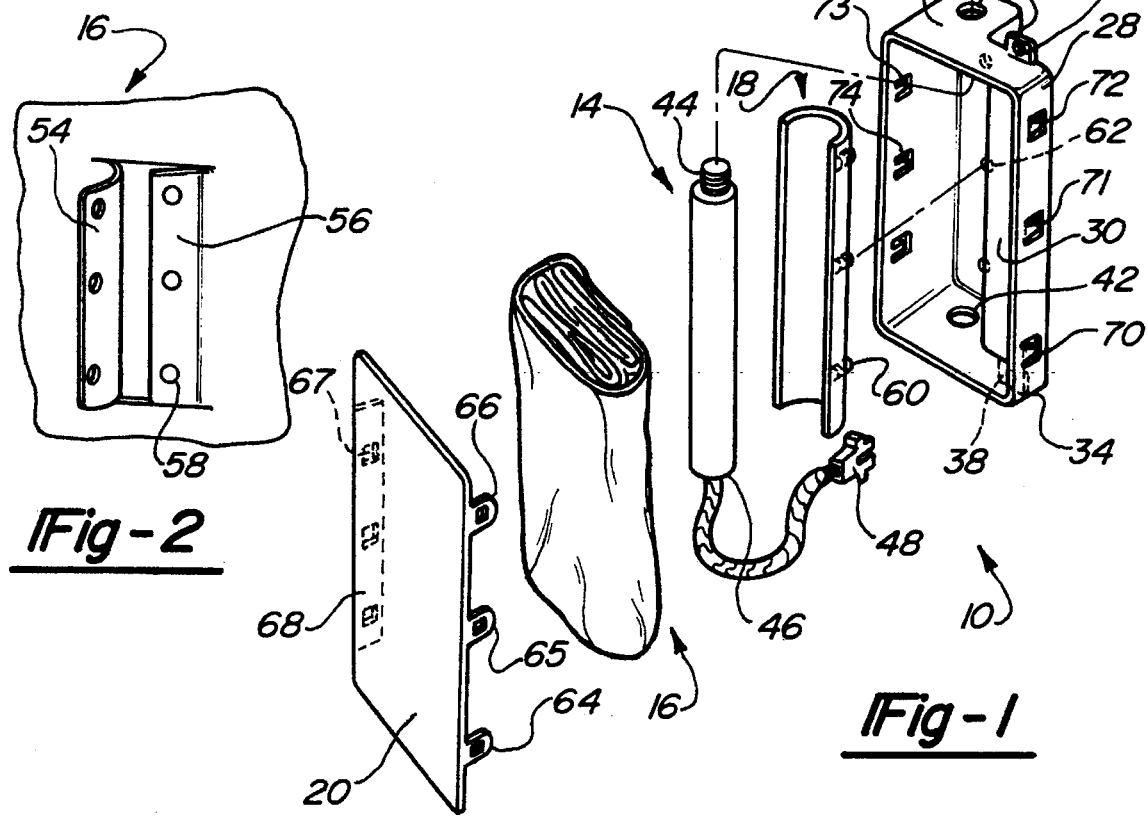

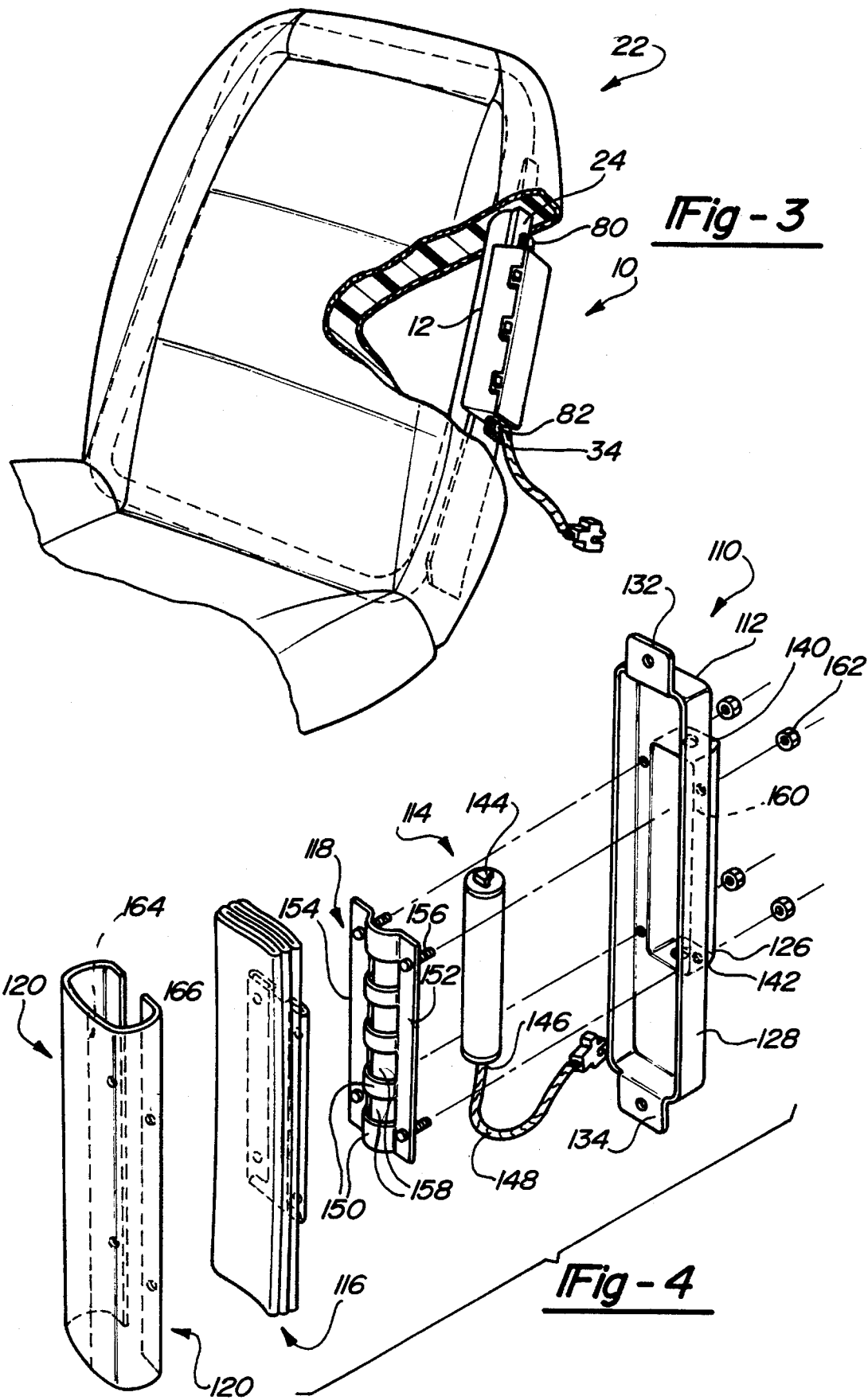

SEAT MOUNTED SIDE IMPACT MODULE

FIELD OF THE INVENTION

This invention relates generally to inflatable motor vehicle occupant restraint systems, and more particularly, to an improved seat mounted module assembly for a vehicle supplemental inflatable restraint system which provides side impact protection.

BACKGROUND OF THE INVENTION

A significant percentage of occupant injuries are caused by side impact collisions. Conventional air bag modules have been utilized in frontal collisions in order to minimize occupant injuries. A typical air bag module has a housing, an inflator affixed to the housing, and an air cushion or air bag that is part of a restraint module. A crash sensor is used to sense a vehicle collision which triggers the inflator to release inflation gases and inflate the air bag. Vehicle air bags can provide a significant decrease in occupant injuries during frontal impacts. In view of this, recent attempts have been made to incorporate side impact air bags into vehicles in order to produce a similar reduction in occupant injury resulting from side impacts.

One type of side impact module assembly is mounted within a vehicle door in combination with a side impact sensor. The air bag is retained behind a deployment panel that opens to release the air bag during deployment. However, one problem with this type of side impact module results from the fact that different size occupants are present in the vehicle and the seats can be adjusted to various positions within the vehicle. For example, a large occupant will move a seat on the adjustable seat track to a rearmost position whereas a small occupant will move the seat to a fully forward position. Therefore, a larger air bag must be deployed from the vehicle door in order to cover the entire range of occupant seating positions and occupant sizes. Large air bags are problematic for side impact protection since the impact must be sensed and the bag inflated in an exceptionally short time period.

A second type of side impact air bag module is mounted to the vehicle's B-pillar or lock pillar. However, this implementation still suffers from the same problems inherent with mounting the module to a vehicle door; namely, the larger air bag must be utilized in order to cover the entire range of position of variously sized occupants.

A third type of side impact air bag module is mounted to a vehicle seat. By mounting the air bag module to a seat which moves with the occupant, the air bag can be deployed to a same position relative to the occupant regardless of the size and seating position of the occupant. However, attempts at mounting a side impact module to a vehicle seat have proved awkward and cumbersome to date. Typically, a side impact module similar to those used for a front collision passenger inflator module are incorporated within a vehicle seat. Such modules typically utilize a large module housing that necessitates a significant re-positioning of structural members within the vehicle seat. Therefore, the seat packaging becomes more difficult. In addition to the foregoing, there is a continuing need to provide ease of assembly of the module as well as convenient mounting to the vehicle.

In order to address the design issues presented above, it is an object of the present invention to provide an improved side impact air bag module for a vehicle supplemental inflatable restraint system.

SUMMARY OF THE INVENTION

In accordance with this invention, several embodiments of side impact module assemblies are described. In each case, the assembly has a shape that conforms to an automobile seat frame for compact packaging. In one embodiment, the module housing has an L-shaped cross-sectional configuration. A pair of ears extend from the housing for mounting the housing to a vertical seat frame member. A mounting opening is provided at each end of the housing for retaining an inflator therein. Additionally, a retainer having a semi-circumferential configuration is used to trap the inflator in the housing. A deployment cover molded from a plastic material has clips for mating the cover to the housing. In its assembled condition, the retainer, inflator, and cushion are assembled within the housing, afterwhich the deployment cover is snapped onto the housing. The module features an assembly approach which provides simplified assembly and uses a limited number of parts. Additional embodiments provide housings with differing shapes including a design with a T-shaped cross-section, and another with an opening through its back surface providing clearance for a portion of the inflator. Each embodiment features compact construction and uses a limited number of parts. These units can further be assembled as a unit which can be easily affixed to the vehicle seat frame.

Further objects, features and advantages of the invention will become apparent from a consideration of the following description and the appended claims when taken in connection with the accompanying drawings.

BRIEF DESCRIPTION OF THE DRAWINGS

FIG. 1 is an exploded schematic perspective view of a preferred seat mounted side impact module assembly of this invention ready for assembly to a vertical seat frame member of a vehicle front seat;

FIG. 2 is a partial plan view of the air bag of FIG. 1 including an inflation opening and mounting flaps suitable for mounting the air bag to other components of the module assembly;

FIG. 3 is a perspective view of the assembled seat mounted side impact module assembly of FIG. 1 assembled to a vertical seat frame member;

FIG. 4 is an exploded schematic perspective view of a first alternate embodiment of seat mounted side impact module assembly according to this invention;

FIG. 5 is an exploded schematic perspective view of a second alternate embodiment of a seat mounted side impact module assembly according to this invention.

DETAILED DESCRIPTION OF THE PREFERRED EMBODIMENT

In accordance with a preferred embodiment of this invention, a seat mounted side impact module assembly 10, as shown in FIGS. 1 and 3, is formed from a housing 12, an inflator 14, an air bag 16, a retainer 18, and a cover 20 that snap-fastens to the housing to encase the inflator, air bag, and retainer within the housing. The inflator 14 has a pyrotechnic propellant, or a compressed gas propellant, or a combination of both referred to as a "hybrid" inflator. As shown in FIG. 3, the completely assembled module assembly 10 is bolted to a vehicle seat back 22 along a vertically extending seat frame member 24.

As shown in FIG. 1, the housing 12 is preferably formed from a deep-drawn sheet metal stamping with a deployment opening which faces outboard and a back surface having a deep-well portion 26 and a shallow-well portion 28. Alternatively, the housing is formed from either a magnesium casting, or is molded from a plastic material. The deep-well portion 26 is constructed and arranged to receive the inflator 14. The shallow-well portion 28 which communicates with the deep-well portion 26 receives a substantial remaining portion of the air bag cushion in a folded pre-inflation configuration. A recessed mounting face 30 is formed on a back face of the shallow-well portion 28 adjacent the deep-well portion 26. Face 30 mates in engagement with the outboard surface of the vertical seat frame member 24 upon assembly of a module to a seat back 22. A pair of mounting ears 32 and 34 extend from each end of the module along the mounting face 30. Fastener openings 36 and 38 are provided in each ear 32 and 34, respectively, through which a fastener is engaged when mounting the module assembly to a vehicle seat back.

In order to mount the inflator 14 within the deep well portion 26 of the housing 12, a pair of mounting openings 40 and 42 are provided at each end of portion 26. To assemble the inflator 14 within the housing 12, an electrical cable and connector 48 are passed through opening 42 until a stud 46 on the bottom inflator is received within the opening. Subsequently, a threaded end stud 44 extending from the top of the inflator 14 is passed through mounting opening 40 in the top of the housing. A bushing 52 is received over an end of the threaded stud 44 extending through the exterior of the housing 12. Thereafter, a Torx nut 50 is threaded onto the stud 44, trapping the inflator within the housing along each mounting opening 40 and 42.

In order to retain the air bag 16 to the housing 12, the retainer 18 is trapped between the inflator and the deep-well portion 26 of the housing 12 in a manner which engages a pair of flaps 54 and 56 on the air bag 16 shown in FIG. 2. Each flap 54 and 56 is provided with three mounting holes 58 which are received over three similarly spaced mounting studs 60 extending rearwardly of the retainer 18. The retainer 18 is formed from a semi-circumferential piece of tubing or is stamped to that configuration. Furthermore, receiving holes 62 are provided in the bottom of the deep-well portion 26 of housing 12 which traps the air bag flaps 54 and 56 on the mounting stud 60 when completely assembled in the housing.

The air bag is sized to provide protection to the occupant's pelvis and thorax. The air bag is preferably constructed from a single-piece of Takata Alpha-Light™ silicone coated 420 denier Nylon, having a 46-by-46 weave main panel joined together with a periphery sew. Construction of such an air bag is detailed in Applicant's co-pending patent application Ser. No. 08/346,895, filed Nov. 30, 1994, which is herein incorporated by reference. Such an air bag construction offers a light-weight, small package suitable for packaging within the housing 12 of this invention. The air bag has a plurality of discrete vent holes cut in the cushion facing outwardly of the occupant.

As shown in FIG. 2, a pair of flaps 54 and 56 are provided to facilitate mounting of the air bag 16. Preferably, an H-shaped slit arrangement is provided in the air bag producing the pair of free edges. Flaps 54 and 56 are then sewn to each of the free edges formed by the slit in order to provide suitably sized flaps which can extend around either side of the inflator 14 and retainer 18. One flap is received about one side of the inflator on top of the mounting stud 60. Subsequently, the other flap is received about the other side of the inflator to lie over the studs 60. Then, the air bag 16, the inflator 14, and the retainer 18 are inserted within the housing and the Torx nut end 50 and bushing 52 are received over threaded stud 44, trapping the air bag, inflator and retainer within the housing.

The deployment cover 20 is snapped onto the housing 12 by engaging clips 64–69 on the cover over complementary corresponding tabs 70–75 located on either outer surface of the housing 12. Each housing tab has a front bevel face with an overhanging lip. A hole on each clip must be snapped over the corresponding overhanging lip so as to forcibly engage the cover to the housing. Preferably, the cover 20 is formed from a single piece of elastomeric material and has a molded tear seam extending vertically along a central portion of the cover. In one application, a tear seam is provided in the seat trim cover (not shown) and the deployment cover is provided on the housing so as to facilitate pre-assembly of the entire module before mounting it to a seat back. Alternatively, cover 20 can be configured to be exposed and blend with the seat trim cover. In both cases, a path is provided for the air bag 16 as it inflates from the module 10 through the housing inflator opening and the cover for deployment outboard of an occupant during a vehicle side impact collision.

FIG. 3 depicts a completely assembled side impact module 10 which can be delivered to a seat supplier and assembled to the lateral outboard surface of a vertical seat frame member 24. As shown in FIG. 3, a pair of threaded fasteners 80 and 82 are received, one through each mounting ear 32 and 34, respectively, where they are threaded into weld nuts 84 and 86 within the seat frame member 24. The deep-well portion 26 of the housing nests alongside the seat frame member, essentially along a back edge. The resulting L-shaped cross-sectional configuration of the housing 12 contributes to mounting the module 10 in a stream-lined and in conforming manner alongside the seat back frame with the housing deep well portion 26 inboard of the outboard surface of the frame back.

FIG. 4 depicts an alternate construction of a seat mounted side impact module assembly 110 including a housing 112, an inflator 114, an air bag 116, a retainer 118, and a cover 120. The housing 112 of this construction has a deployment opening and a back surface having a centrally located and rearwardly extending deep-well portion 126 extending from the rear face of a shallow-well portion 128. Assembled to a vertical seat frame member 24, a deep-well portion 126 extends into a recess in the seat frame member to facilitate recessed mounting of the housing. Shallow-well portion 128 is provided for storing the folded air bag 116 prior to deployment. As with the case for the preferred embodiment of FIG. 1 and 3, the deep-well portion 126 is constructed for retaining the inflator 114 therein.

In an example product, housing 112 is formed from a piece of 1.2 mm thick deep-drawn 1010 grade steel. A pair of mounting ears 132 and 134 are provided, one at each end of the housing for mounting the module 110 to a vertical seat frame member 24. Preferably, ears 132 and 134 mount to flanges rearwardly extending from the seat frame member 24 such that deep-well portion 126 nests directly behind the seat frame member 24 when assembled. In order to mount the inflator 114 within the housing 112, a keyed mounting opening 140 is provided in the top of the deep:well portion 126 and a circular mounting opening 142 is provided in a bottom face of the portion 126. The inflator 114 has a keyed stud 144 extending from the top of the inflator and a stud 146 extending from the bottom of the inflator. An electrical cable and connector 148 extend from the inflator bottom 146. To assemble the inflator within the deep-well portion 126 of the housing, the electrical cable and connector 148 are first inserted through mounting opening 142, and the keyed end stud 144 is then matingly received within the keyed mounting opening 140, positioning the inflator in a properly oriented position within the housing. As such the inflator can be mounted within the housing so as to orient inflation orifices on the inflator in a direction to inflate the air bag.

The inflator is further retained within the housing via retainer 118. Retainer 118 is preferably constructed from a single-piece of stamped sheet metal having a central semi-circumferential portion 150 with a pair of longitudinally extending flanges 152 and 154 extending on either side. A pair of studs 156 extend from each flange for securing the retainer forcibly against the inflator to the back surface of the housing. A circumferential portion 150 includes a plurality of openings 158 through which inflation gases pass when inflating the air bag. Furthermore, corresponding mounting holes 160 are provided within the housing 112 while rigidly affixing each bolt 156 and a retainer to the housing. Each bolt 156 is secured with a nut 162. The partially circumferential portion 150 is sized and positioned in relation to the inflator and housing so as to forcibly engage the inflator between the retainer and housing as the nuts 162 are tightened. The air bag 116 is constructed as depicted in FIG. 2 embodiment. Air bag flaps 54 and 56, each with a pair of mounting holes 58 are received over bolts 156, thereby trapping the air bag between the retainer end housing subsequent to attaching the nuts 162.

The air bag cover 120 is constructed from a single piece of plastic material preferably having molded in deployment seam 164 and a plurality of mounting holes 166. The cover is wrapped around the pre-packaged and folded air bag 116 as well as retainer 118 such that the flaps on the air bag are received over the bolts 156 in conjunction with the cover holes 166. Thereafter, nuts 162 are applied which retain the cover over the air bag, retain the air bag through the housing, and trap the inflator therebetween.

FIG. 5 depicts a second alternative embodiment for a seat mounted side impact module assembly 210 including a housing 212, an inflator 214, an air bag 16, and a cover 220. In this embodiment, the housing 212 has a deployment opening and a back surface with a central opening 226 in which a portion of the inflator 214 extends wherein mounted. Additionally, a pair of mounting ears 232 and 234 are similarly used to retain the housing to a vertical seat frame member 24. Alternatively, opening 226 can be replaced with a deep-well portion similar to that depicted in FIG. 4.

In the FIG. 5 construction, inflator 214 is constructed with integral retaining flanges 236–239 extending from either end. Each flange receives a mounting bolt 240 which extends through a mounting hole 242 in the bottom of the housing 212. Preferably, the inflator 214 is sized to snugly and sealingly fit within the bottom opening 226 of the housing to cooperate with the housing to form a semi-sealed interior volume.

The air bag 216 of assembly 210 is similar to that depicted in FIGS. 1-4 wherein a pair of flaps 254 and 256 extend from the air bag about an inflation opening. Each flap has a pair of mounting holes 258 that in conjunction with corresponding mounting holes 260 in the cover 220 are received over each bolt 240, thereby trapping a cushion end cover to the housing once assembled. The inflator is thus retained in the housing, with the trapped cushion and cover.

It is to be understood that the invention is not limited to the exact construction illustrated and described above, but that various changes and modifications may be made without departing from the spirit and scope of the invention as defined in the following claims.

We claim:

1. A side impact air bag module assembly for mounting to a vehicle seat of the type having a generally vertically extending seat frame member said assembly comprising:

a housing having a deployment opening with a back surface having a shallow-well portion contiguous with a deep-well portion;

an inflator including mounting means configured for mounting said inflator within said housing deep-well portion;

an inflatable side impact air bag having an inflation opening and a pair of flaps provided in opposed relationship about said inflation opening, said flaps including mounting holes;

a module cover for covering said deployment opening, said module cover having a tear seam configured to open during air bag deployment;

retaining means configured to engage said air bag flaps and said module cover, said retaining means affixing said air bag flaps and said module cover to said housing; and mounting means for enabling attachment of said assembly to the vehicle seat, said mounting means configured such that said housing deep well portion is positionable at least partially inboard of an outboard surface of the vehicle seat frame member.

2. The module assembly of claim 1 wherein said inflator mounting means comprises at least one keyed stud provided on one end of said inflator and said housing further comprises at least one keyed aperture for receiving said stud, wherein said retaining means engages said inflator within said housing deep-well portion and said keyed stud and keyed aperture orient said inflator within said housing.

3. The module assembly of claim 1 wherein said inflator mounting means and said retaining means comprise a pair of opposed flanged ears extending radially outwardly from each end of said inflator including a mounting bolt configured for retaining said inflator, said air bag, and said module cover within said housing.

4. The module assembly of claim 1 wherein said housing deep-well portion is a deep-drawn tub configured to receive said inflator.

5. The module assembly of claim 4 wherein said housing has an L-shaped cross-sectional configuration.

6. The module assembly of claim 1 wherein said housing deep-well portion comprises an opening provided in a rear face of said housing for receiving at least a portion of said inflator.

7. The module assembly of claim 1 wherein said retaining means includes a partially circumferential retainer having a plurality of rearwardly extending mounting studs each of said studs configured to receive said mounting holes on each of said air bag flaps, wherein said retainer is assembled between said inflator and a bottom portion of said housing deep-well portion so as to entrap said air bag flaps along said retainer via said mounting studs.

8. A side impact air bag module for mounting to a vehicle seat of the type having a generally vertically extending seat frame member, said assembly comprising:

a housing having a deployment opening with a back surface having a shallow-well portion contiguous with a deep-well portion;

an inflator including mounting means configured for mounting said inflator within said housing deep-well portion;

a side impact air bag having an inflation opening and a pair of flaps provided in opposed relationship about said inflation opening, said flaps including mounting holes;

retaining means configured to engage said air bag flaps, said retaining means affixing said air bag flaps to said housing; and mounting means for enabling attachment of said assembly to the vehicle, said mounting means configured such that said housing deep well portion is positionable at least partially inboard of an outboard surface of said vehicle seat frame member wherein said housing further forms a pair of mounting apertures, at opposing ends of said deep-well portion, and said inflator mounting means further comprising a stud extending from each end of said inflator constructed and arranged for mating engagement with said housing mounting apertures, one receivable in each aperture, one of said studs further including a threaded portion extending from one of said mounting apertures so as to receive a nut and entrap said inflator within said housing.

9. The module assembly of claim 8 further comprising an air bag cover having a plurality of integrally formed clips constructed and arranged along opposed longitudinal edges and configured to engage with a plurality of tabs constructed and arranged along outer longitudinal edges of said housing.

10. The improved module assembly of claim 9 wherein said cover is integrally molded from a single piece of plastic material.

11. A side impact air bag module for mounting to a vehicle seat of the type having a generally vertically extending seat frame member, said assembly comprising:

a housing having a deployment opening with a back surface having a shallow-well portion contiguous with a deep-well portion;

an inflator including mounting means configured for mounting said inflator within said housing deep-well portion;

a side impact air bag having an inflation opening and a pair of flaps provided in opposed relationship about said inflation opening, said flaps including mounting holes;

retaining means configured to engage said air bag flaps, said retaining means affixing said air bag flaps to said housing:

mounting means for enabling attachment of said assembly to the vehicle, said mounting means configured such that said housing deep well portion is positionable at least partially inboard of an outboard surface of said vehicle seat frame member; and an air bag cover having a pair of longitudinally extending opposed flaps, each flap including a plurality of apertures configured for mounting between said retaining means and said housing so as to retain said cover to said housing.

12. A side impact air bag module for mounting to a vehicle seat of the type having a generally vertically extending seat frame member, said assembly comprising:

a housing having a deployment opening with a back surface having a shallow-well portion contiguous with a deep-well portion;

an inflator including mounting means configured for mounting said inflator within said housing deep-well portion;

a side impact air bag having an inflation opening and a pair of flaps provided in opposed relationship about said inflation opening, said flaps including mounting holes;

retaining means configured to engage said air bag flaps, said retaining means affixing said air bag flaps to said housing; and mounting means for enabling attachment of said assembly to the vehicle, said mounting means configured such that said housing deep well portion is positionable at least partially inboard of an outboard surface of said vehicle seat frame member wherein said housing has a T-shaped cross-sectional configuration.

13. A side impact air bag module for mounting to a vehicle seat of the type having a generally vertically extending seat frame member the assembly comprising:

a housing having a deployment opening with a back surface having shallow-well portion contiguous with a deep-well portion;

an inflator including mounting means configured for mounting said inflator within said housing deep-well portion;

a side impact air bag having an inflation opening and a pair of flaps provided in opposed relationship about said inflation opening, said flaps including mounting holes;

retaining means configured to engage said air bag flaps, said retaining means affixing said air bag flaps to said housing; and mounting means for enabling attachment of said assembly to the vehicle, said mounting means configured such that said housing deep well portion is positionable at least partially inboard of an outboard surface of said vehicle seat frame member wherein said inflator further comprises at least one keyed stud and said housing further comprises at least one keyed mounting opening for receiving said inflator in an aligned configuration, and said retaining means comprises a partially circumferential member having a pair of longitudinally extending flanges on either side, each of said flanges including a plurality of fasteners for securing said retainer to said housing to trap said inflator therebetween, said partially circumferentially portion of said retaining means including a plurality of inflation openings for passing inflation gasses from said inflator into said air bag.

14. The module assembly of claim 13 further comprising an air bag cover having a pair of opposed longitudinal edges each with a pair of mounting openings configured to mount over said fasteners such that said cover is trapped between said retaining means and said housing.

* * * * *